United States Patent Office 2,918,502
Patented Dec. 22, 1959

2,918,502

PREPARATION OF DIARYLALKANES

Louis Schmerling, Riverside, Ill., assignor, by mesne assignments, to Universal Oil Products Company, Des Plaines, Ill., a corporation of Delaware No Drawing. Application June 24, 1958
Serial No. 744,050

14 Claims. (Cl. 260—668)

This application is a continuation-in-part of my copending application Serial No. 594,083 filed June 27, 1956, now abandoned. This invention relates to a process for the preparation of diaryl compounds, and more particularly to a process for preparing diarylalkanes.

An object of this invention is to provide a process for preparing diaryl compounds.

Another object of this invention is to provide a process for the preparation of bis-diarylalkanes.

One embodiment of this invention resides in a process which comprises reacting a dialkyl substituted aromatic compound of the general formula:

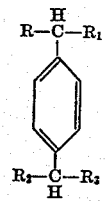

in which R, $R_1$, $R_2$ and $R_3$ are independently selected from the group consisting of hydrogen, alkyl, alkylene, cycloalkyl and cycloalkylalkyl radicals with a polyhaloalkene free of quaternary carbon atoms and containing at least 2 halogen atoms attached to the same carbon atom in the presence of a Friedel-Crafts catalyst at condensation conditions, and recovering the resultant reaction products.

Another embodiment of this invention resides in a process which comprises reacting a dialkyl substituted aromatic compound of the general formula:

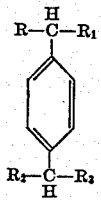

in which R, $R_1$, $R_2$ and $R_3$ are independently selected from the group consisting of hydrogen, alkyl, alkylene, cycloalkyl and cycloalkylalkyl radicals with a polyhaloalkene free of quaternary carbon atoms and containing at least 2 halogen atoms attached to the same carbon atom in the presence of aluminum chloride at condensation conditions, and recovering the resultant reaction products.

A specific embodiment of the invention is found in a process which comprises reacting p-xylene with a polyhaloalkane free of quaternary carbon atoms and containing at least 2 halogen atoms attached to the same carbon atom in the presence of aluminum chloride at condensation conditions, and recovering the resultant reaction products.

A more specific embodiment of the invention resides in a process for the preparation of bis-(p-xylyl)methane which comprises reacting p-xylene with ethylidene chloride in the presence of aluminum chloride at a temperature in the range of from about —20° to about 150° C. and at a pressure in the range of from about atmospheric to about 50 atmospheres, and recovering the resultant bis-(p-xylyl)methane.

Other objects and embodiments referring to alternative dialkyl substituted aromatic compounds having the hereinbefore set forth general formula, alternative polyhaloalkanes and alternative catalysts will be found in the following further detailed description of the invention.

It has now been discovered that p-dialkyl aromatic compounds and more particularly, p-dialkylbenzenes, when reacted with a polyhaloalkane free of quaternary carbon atoms and containing at least two halogen atoms attached to the same carbon atom in the presence of certain Friedel-Crafts catalysts will form a "dimerized" p-dialkylbenzene, i.e., a compound containing two of the p-dialkylbenzene moieties. This reaction also is accompanied by several other reactions among which are alkylation, hydrogen transfer and transaralkylation to form other side products which may also be useful products. The thus formed "dimerized" dialkylbenzenes may be sulfonated and the resulting derivatives used as wetting agents. It is also possible to nitrate and reduce the products of the present invention to form mono- and polyamines, these mono- and polyamines being used to inhibit the oxidation of various organic compounds which are susceptible to oxidative deterioration. In addition the amines may in turn be converted to phenols by diazotization and hydrolysis to form other compounds which are also useful as oxidation inhibitors.

The reaction of this invention may be illustrated by the reaction of p-xylene with 1,1-dichloroethane, for example, as shown by the following equation:

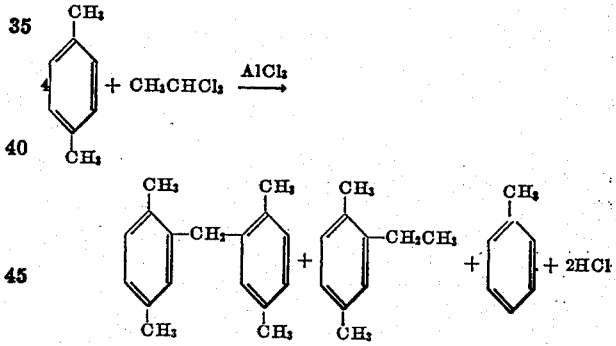

1,4-dialkylbenzenes which may undergo reaction with the polyhaloalkane having the necessary configuration according to the process of this invention include 1,4-dimethylbenzene (p-xylene), 1-methyl-4-ethylbenzene, 1 - methyl - 4 - propylbenzene, 1 - methyl - 4 - isopropylbenzene (p-cymene), 1-methyl-4-butylbenzene, 1-methyl-4 - isobutylbenzene, 1 - methyl - 4 - amylbenzene, 1,4-diethylbenzene, 1-ethyl-4-propylbenzene, 1-ethyl-4-isopropylbenzene, 1-ethyl-4-isobutylbenzene, 1,4-dipropylbenzene, 1-propyl-4-butylbenzene, etc., 1-methyl - 4 - cyclopentylbenzene, 1 - methyl - 4 - cyclohexylbenzene, 1 - ethyl - 4 - cyclopentylbenzene, 1 - ethyl - 4 - cyclohexylbenzene, 1-propyl-4-cyclopentylbenzene, 1-propyl-4-cyclohexylbenzene, 1,4-dicyclopentylbenzene, 1,4-dicyclohexylbenzene, 1-cyclopentyl-4-cyclohexylbenzene, etc., 1 - methyl - 4 - (cyclopentylmethyl)benzene, 1 - methyl-4 - (cyclohexylmethyl)benzene, 1 - methyl - 4 - (2 - cyclopentylethyl)benzene, 1 - methyl - 4 - (2 - cyclohexylethyl)benzene, 1 - ethyl - 4 - (cyclopentylmethyl)benzene, 1-ethyl-4-(cyclohexylmethyl)benzene, 1-ethyl-4-(2 - cyclopentylethyl)benzene, 1 - ethyl - 4 - (2 - cyclohexylethyl)benzene, 1 - propyl - 4 - (cyclopentylmethyl)-benzene, 1 - propyl - 4 - (cyclohexylmethyl)benzene, 1 - propyl - 4 - (2 - cyclopentylethyl)benzene, 1 - propyl- 4-(2-cyclohexylethyl)benzene, etc., 1-methyl-4-(2-methylcyclopentyl)benzene, 1 - methyl - 4 - (2 - ethylcyclopentyl)benzene, 1 - methyl - 4 - (2 - methylcyclohexyl)-benzene, 1-methyl-4-(2-ethylcyclohexyl)benzene, 1-ethyl-4 - (2 - methylcyclopentyl)benzene, 1 - ethyl - 4 - (2-ethylcyclopentyl)benzene, 1 - ethyl - 4 - (2 - methylcyclohexyl)benzene, 1 - ethyl - 4 - (2 - methylcyclohexyl)-benzene, 1-ethyl-4-(2-ethylcyclohexyl)benzene, 1-propyl-4-(2-methylcyclopentyl)benzene, 1 - propyl-4-(2methylcyclohexyl)benzene, 1 - propyl - 4 - (2-ethylcyclohexyl)benzene, etc.

Polyhaloalkanes free from quaternary carbon atoms and containing at least two halogen atoms attached to the same carbon atom (the preferred halogens comprising chlorine and bromine) which may be reacted with the aforementioned dialkylbenzenes include dichloromethane (methylene chloride), chloroform, carbon tetrachloride, dibromomethane, bromoform, carbon tetrabromide, 1,1-dichloroethane, 1,1,2-trichloroethane, 1,1-dibromoethane, 1,1,2-tribromoethane, 1,1-dichloropropane, 1,1-dibromopropane, 2,2-dichloropropane, 2,2-dibromopropane, 1,1-dichlorobutane, 1,1-dibromobutane, 2,2-dichlorobutane, 2,2-dibromobutane, 1,1-dichloro-3-methylpropane, etc. The preferred polyhaloalkanes are those in which the halogen is chlorine and/or bromine. It is understood that the above mentioned 1,4-dialkylbenzenes and dihaloalkanes free of quaternary carbon atoms and containing at least two halogen atoms attached to the same carbon atom are only representatives of the class of compounds which may be used, and that the process of this invention is not necessarily limited thereto.

The reaction between the 1,4-dialkylbenzenes with a polyhaloalkane free of quaternary carbon atoms and containing at least two halogen atoms attached to the same carbon atom takes place in the presence of certain active Friedel-Crafts type catalysts, said catalysts including in particular aluminum chloride, aluminum bromide, zirconium chloride and boron fluoride. The reaction will take place at temperatures ranging from about −20° to about 150° C. and preferably in the range of from about 0° to about 100° C., the range of temperature depending upon the reactors and the catalysts used. In addition, the pressure at which this reaction takes place should be sufficient to maintain a substantial portion of the reactants in the liquid phase and may range from atmospheric to about 50 atmospheres or higher.

The reaction may be carried out, if so desired, in the presence of an organic solvent. However, the particular solvent used must be inert and should not enter into the reaction nor act as a hydrogen donor. Inert solvents which may be used include normal paraffins such as n-pentane, n-hexane, n-heptane, etc., cyclopentane, cyclohexane, etc.

The process of this invention may be effected in any suitable manner and may comprise either a batch or a continuous type operation. For example, when a batch type operation is used, a quantity of the 1,4-dialkylbenzene and the catalyst are placed in an appropriate condensation apparatus and the polyhaloalkane free of quaternary carbon atoms and containing at least two halogen atoms attached to the same carbon atom dissolved in an additional amount of the 1,4-dialkylbenzene is gradually added thereto at the desired temperature. The reaction is often maintained in the range of from about 0° to about 25° C. During the initial portion of the reaction, the product may be raised to a higher temperature and maintained thereat during the remainder of the residence time. At the end of a predetermined time, the reaction product is separated from any unreacted starting material, washed with water and dilute alkali, dried and subjected to fractional distillation under reduced pressure to recover the desired product.

The reaction between the 1,4-dialkylbenzene and the polyhaloalkane having the necessary configuration may also be effected in a continuous reaction. In this type of operation the 1,4-dialkylbenzene is continuously charged to a reactor which is maintained at the proper operating conditions of temperature and pressure. The polyhaloalkane free of quaternary carbon atoms and containing at least two halogen atoms attached to the same carbon atom is also continuously charged to the reactor through a separate line, or if so desired, the polyhaloalkane and the 1,4-dialkylbenzene may be admixed prior to admission into said reactor and charged thereto in a single line. A particularly suitable type of operation comprises a fixed bed type in which the catalyst is disposed as a fixed bed in the reactor and the reactants are passed therethrough either upwardly or downwardly. The reaction product is continuously withdrawn from the reactor, separated from the reactor effluent and purified by conventional means hereinbefore set forth while the unreacted starting materials may be recycled to form a portion of the feed stock. The reactants comprising the 1,4-dialkylbenzene and the polyhaloalkane are charged at a liquid hourly space velocity ranging from about 0.1 to about 10, said liquid hourly space velocity being defined as the volume of reactants per volume of catalyst per hour.

Other continuous types of operation which may be used in this process include the fluidized type of operation in which the reactants comprising the 1,4-dialkylbenzene and the polyhaloalkane free of quaternary carbon atoms and containing at least two halogen atoms attached to the same carbon atom and the catalyst are maintained in a state of turbulence under hindered settling conditions in the reaction zone; the compact moving bed type of operation in which the catalyst and reactants are passed either concurrently or countercurrently to each other; and the slurry type process in which the catalyst is carried into the reaction zone as a slurry in the 1,4-dialkylbenzene. It is to be understood that in each of the latter mentioned types of continuous processes the unreacted starting materials may be separated out and recycled for use as a portion of the feed material while the desired product is withdrawn and purified.

The following examples are given to illustrate the process of this invention, which, however, are not intended to limit the generally broad scope of the present invention in strict accordance therewith.

*Example I*

A mixture of 212 g. (2.0 moles) of p-xylene and 10 g. of aluminum chloride were placed in an alkylation flask. A solution of 98 g. (1.0 mole) of 1,1-dichloroethane dissolved in 107 g. (1.0 mole) of p-xylene was slowly added during a period of about 1.7 hours while said mixture was being continuously stirred. The temperature of the flask was maintained at 22–26° C. during the addition. The reaction mixture was stirred for an additional 1.7 hours at a temperature in the range of from about 20° to about 26° C., during which time 7 g. of aluminum chloride was added at about 30 minute intervals in increments of 3 g., 2 g., and 2 g. respectively. At the end of the reaction time the upper layer of the reaction mixture was separated from the lower catalyst layer, washed with water, dilute alkali, dried and subjected to fractional distillation under reduced pressure. Thirty-two grams of bis-(p-xylyl)methane were separated from the reaction mixture.

There were also obtained cuts comprising 2-ethyl-p-xylene (30 g.) boiling at 184° C. at atmospheric pressure) and 2,5-diethyl-p-xylene (4.5 g.) boiling at 225–230° C. at atmospheric pressure).

*Example II*

A mixture comprising 212 g. (2.0 moles) of p-xylene and 10 g. of aluminum chloride was placed in an alkylating flask. While the mixture was continuously stirred 85 g. (1.0 mole) of methylene chloride dissolved in 107 g. (1.0 mole) of p-xylene was gradually added thereto. The addition of the methylene chloride in p-xylene consumed approximately one hour, during which time the temperature of the flask was maintained in the range of from 28° to 31° C. After completion of the aforementioned addition the reaction mixture was stirred for an additional two hours during which time the temperature of the flask was raised from 31° to 63° C. At the end of this time the flask and contents thereof were cooled to room temperature and the upper layer separated from the lower catalyst layer, washed with water, dilute alkali, dried and subjected to fractional distillation under reduced pressure. A cut boiling at 134–138° C. at 2.5 mm. pressure (about 327–329° C. at 760 mm. pressure) was separated out. This cut, amounting to 18 g. and comprising bis-(p-xylyl)methane, crystallized upon standing and had a melting point of 62–63° C.

In addition, there was also obtained 14 g. of a cut boiling at 111° C. comprising toluene, 24 g. of a cut having a boiling point of 167–169° C. at atmospheric pressure comprising 1,2,4-trimethylbenzene and 6 g. of a cut having a boiling point of 195–196° C. at atmospheric pressure and melting at 78–79° C. comprising durene (1,2,4,5-tetramethylbenzene).

*Example III*

A mixture of 122 g. (1.0 mole) of p-cymene and 10 g. of aluminum chloride is placed in an alkylating flask which was maintained at about 30° C. A solution of 50 g. (0.5 mole) of 1,1-dichloroethane dissolved in 122 g. (1.0 mole) of p-cymene is slowly added to the mixture with continual stirring during about 2 hours. The resulting mixture is subsequently stirred for an additional 6 hours during which time the temperature of the flask is raised to about 80° C. At the end of this time the flask and contents thereof are cooled to room temperature, the upper layer of the reaction mixture is separated from the lower catalyst layer, washed with water, dilute alkali, dried and subjected to fractional distillation under reduced pressure. The cut boiling at 158–162° C. at 1.6 mm. pressure (about 357–363° C. at atmospheric pressure) comprising 3-(2-p-cymyl)-1,1,3,5-tetramethylindan, also named 3-carvacryl-1,1,3,5-tetramethylindan is recovered. This cut crystallizes and upon being recrystallized from ethanol has a melting point of 133–134° C.

In addition to the 3-carvacryl-1,1,3,5-tetramethylindan, toluene, isopropyl-p-cymene, 1,1,3,5 - tetramethylindan, ethyltoluene, and ethyl-p-cymene are also recovered.

I claim as my invention:

1. A process which comprises reacting a dialkyl substituted aromatic compound of the general formula:

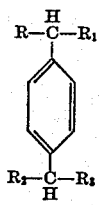

in which R, $R_1$, $R_2$ and $R_3$ are independently selected from the group consisting of hydrogen, alkyl, alkylene, cycloalkyl and cycloalkylalkyl radicals with a polyhaloalkane free of quaternary carbon atoms and containing at least 2 halogen atoms attached to the same carbon atom in the presence of a Friedel-Crafts catalyst at a condensation temperature of from about −20° C. to about 150° C., and recovering the resultant reaction products.

2. A process which comprises reacting a dialkyl substituted aromatic compound of the general formula:

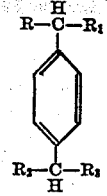

in which R, $R_1$, $R_2$ and $R_3$ are independently selected from the group consisting of hydrogen, alkyl, alkylene, cycloalkyl and cycloalkylalkyl radicals with a polyhaloalkane free of quaternary carbon atoms and containing at least 2 halogen atoms attached to the same carbon atom in the presence of aluminum chloride at a condensation temperature of from about −20° C. to about 150° C., and recovering the resultant reaction products.

3. A process which comprises reacting a dialkyl substituted aromatic compound of the general formula:

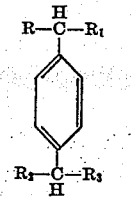

in which R, $R_1$, $R_2$ and $R_3$ are independently selected from the group consisting of hydrogen, alkyl, alkylene, cycloalkyl and cycloalkylalkyl radicals with a polyhaloalkane free of quaternary carbon atoms and containing at least 2 halogen atoms attached to the same carbon atom in the presence of aluminum bromide at a condensation temperature of from about −20° C. to about 150° C., and recovering the resultant reaction products.

4. A process which comprises reacting a dialkyl substituted aromatic compound of the general formula:

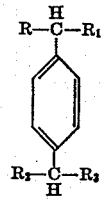

in which R, $R_1$, $R_2$ and $R_3$ are independently selected from the group consisting of hydrogen, alkyl, alkylene, cycloalkyl and cycloalkylalkyl radicals with a polyhaloalkane free of quaternary carbon atoms and containing at least 2 halogen atoms attached to the same carbon atom in the presence of zirconium chloride at a condensation temperature of from about −20° C. to about 150° C., and recovering the resultant reaction products.

5. A process which comprises reacting a dialkyl substituted aromatic compound of the general formula:

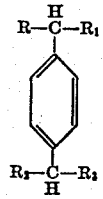

in which R, $R_1$, $R_2$ and $R_3$ are independently selected from the group consisting of hydrogen, alkyl, alkylene, cycloalkyl and cycloalkylalkyl radicals with a polyhaloalkane free of quaternary carbon atoms and containing at least 2 halogen atoms attached to the same carbon atom in the presence of boron fluoride at a condensation temperature of from about −20° C. to about 150° C., and recovering the resultant reaction products.

6. A process which comprises reacting p-xylene with a polyhaloalkane free of quaternary carbon atoms and containing at least 2 halogen atoms attached to the same carbon atom in the presence of aluminum chloride at a condensation temperature of from about −20° C. to about 150° C., and recovering the resultant reaction products.

7. A process which comprises reacting p-cymene with a polyhaloalkane free of quaternary carbon atoms and containing at least 2 halogen atoms attached to the same carbon atom in the presence of aluminum chloride at a condensation temperature of from about −20° C. to about 150° C., and recovering the resultant reaction products.

8. A process which comprises reacting p-diethylbenzene with a polyhaloalkane free of quaternary carbon atoms and containing at least 2 halogen atoms attached to the same carbon atom in the presence of aluminum chloride at a condensation temperature of from about −20° C. to about 150° C., and recovering the resultant reaction products.

9. A process which comprises reacting p-dipropylbenzene with a polyhaloalkane free of quaternary carbon atoms and containing at least 2 halogen atoms attached to the same carbon atom in the presence of aluminum chloride at a condensation temperature of from about −20° C. to about 150° C., and recovering the resultant reaction products.

10. A process which comprises reacting 1-ethyl-4-propylbenzene with a polyhaloalkane free of quaternary carbon atoms and containing at least 2 halogen atoms attached to the same carbon atom in the presence of aluminum chloride at a condensation temperature of from about −20° C. to about 150° C., and recovering the resultant reaction products.

11. A process for the prepartion of bis-(p-xylyl)methane which comprises reacting p-xylene with methylene chloride in the persence of aluminum chloride at a temperature in the range of from about −20° to about 150° C. and at a pressure in the range of from about atmospheric to about 50 atmospheres, and recovering the resultant bis-(p-xylyl)methane.

12. A process for the preparation of bis-(p-xylyl)methane which comprises reacting p-xylene with 1,1-dichloroethane in the presence of aluminum chloride at a temperature in the range of from about 20° to about 30° C. and at a pressure in the range of from about atmospheric to about 50 atmospheres, and recovering the resultant bis-(p-xylyl)methane.

13. A process for the preparation of bis-(p-xylyl)methane which comprises reacting p-xylene with 2,2-dichlorobutane in the presence of aluminum chloride at a temperature in the range of from about −20° to about 150° C. and at a pressure in the range of from about atmospheric to about 50 atmospheres, and recovering the resultant bis(p-xylyl)methane.

14. A process for the preparation of 3-carvacryl-1,1,3,5-tetramethylindan which comprises reacting p-cymene with 1,1-dichloroethane in the presence of aluminum chloride at a temperature in the range of from about 30° to about 80° C. and at a pressure in the range of from about atmospheric to about 50 atmospheres, and recovering the resultant 3-carvacryl-1,1,3,5-tetramethylindan.

References Cited in the file of this patent
UNITED STATES PATENTS 2,833,816     Saffer et al. _____ May 6, 1958